July 3, 1934.  H. J. McLAUGHLIN ET AL  1,965,045

COMBINED MILK CAN COVER AND MEASURING DISPENSER

Filed July 1, 1932

Inventors,
H. J. McLaughlin,
J. C. Barreda.

By Sterling P. Buck,
Attorney.

Patented July 3, 1934

1,965,045

UNITED STATES PATENT OFFICE 1,965,045

COMBINED MILK CAN COVER AND MEASURING DISPENSER

Harold J. McLaughlin and Julian C. Barreda, New York, N. Y.

Application July 1, 1932, Serial No. 620,514

8 Claims. (Cl. 221—114)

This invention relates to liquid measuring and dispensing vessels, and especially to a combined milk can cover and measuring dispenser.

One object of this invention is to provide a most practical, convenient, accurate, and sanitary means of dispensing milk in measured quantities from a milk-can, each measured unit to be uniform in quantity and quality, instead of the unsanitary and sloppy way of dipping the milk from the can into or by means of a measuring vessel, which is exposed to contamination by dust, flies and many other sources of filth and disease, and which does not consistently dispense uniform milk.

Another object is to utilize the milk-can-cover, as the measuring and dispensing vessel in such manner that it remains on duty in protecting the contents of the can, while dispensing the milk and at all times, except when it is removed for cleaning, sterilizing and refilling the can.

Another object is to provide a novel and convenient form of controlling valve mechanism to regulate the flow of milk or other liquid into and out of the measuring vessel or container within the skirt of the milk-can-cover.

Another object is to provide a container and dispenser which prevents tampering with and adulterating the contents of the container, by allowing the mechanism to dispense the liquid, at the same time precluding any possible refilling or adulteration through the dispensing apparatus.

Other objects and important features are pointed out or implied in the following details of description in connection with the accompanying drawing, in which.

Referring, in detail, to the drawing in which similar reference numerals refer to the similar parts in both views, and in which the can-mouth is indicated at C, the invention is now described as follows.

Figure 1:
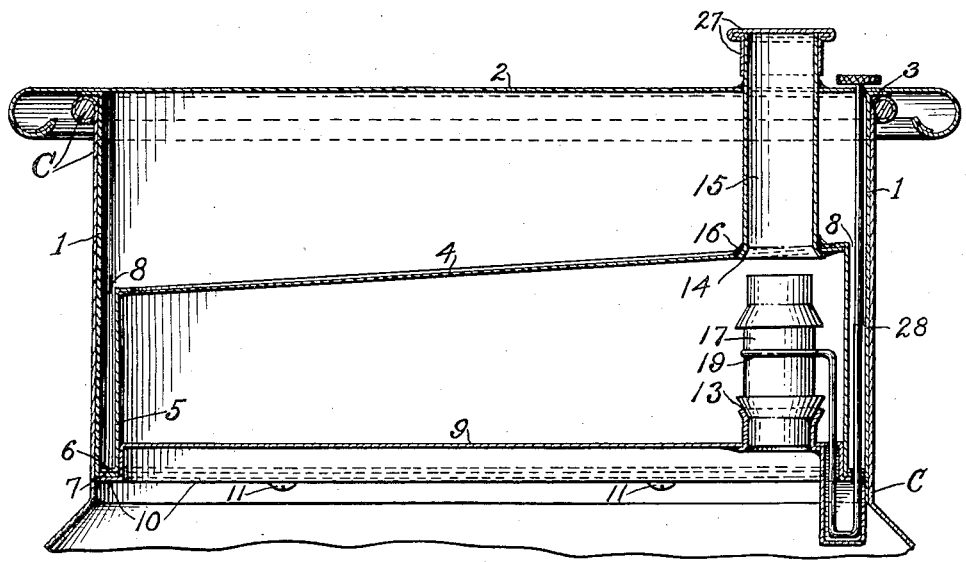
Figure 1 is a central or diametral sectional view, the section being in a vertical plane through the inlet and outlet openings or fixed valve elements, the movable valve elements being shown in full lines, a part of the can's mouth being included.

The skirt or cylindrical wall 1 of the can-cover is united with the upper disc 2 by solder or other appropriate means at 3, said disc having the usual curved annular rim which serves as hand holds for lifting or pulling the skirt 2 out of its snugly fitting engagement with the can-mouth which exerts a sufficient clamping action to prevent the can-cover from falling out when the can is inverted for pouring milk therefrom in measured uniform quantities.

For economical construction of the measuring vessel whose outer wall or outlet-wall is shown at 4, its cylindrical or peripheral wall 5 has an annular flange 6 which is permanently united with an inturned flange 7 of the wall 1 in such manner to provide a space 8 around the wall 5, or between the walls 1 and 5. The removable cover 9, or inner wall of the measuring chamber, has a flange which is normally and snugly seated on the flange 7 and removably secured thereto by screws 11, or other proper means, so it can be removed for gaining access to the interior of the measuring receptacle or chamber.

The wall 9 is provided with an inlet or opening 12 through a valve seat 13, so the milk or liquid can enter therethrough from the can when the latter is inverted with the cover thereon; but the liquid cannot then pass out of the valve-seat 14 which is the inner end of a tube 15 that extends through and closes openings in the walls 2 and 4 and is permanently united with said walls by solder or other appropriate means, as indicated at 16. The liquid is prevented from passing out through the valve seat 14 because the dual valve member 17 is of such length and so placed that before it unseats at 13, allowing the liquid to pass through the inlet 12, it will have closed off the possibility of any of the liquid passing out through the valve seat 14.

A dual valve member 17 is united with a valve stem 18 by any appropriate means, for instance, by a springy loop 19 in a peripheral groove 20, though other attaching means may be used, or the parts 17 and 18 may be formed as an integral unit. A looped part 21 of the valve stem extends through a bearing or aperture 22, and returns through aligned apertures of the flanges 6, 7 and 10 at the point indicated at 23, these aligned apertures forming a second bearing for the valve stem and combine with the bearing 22 for holding the valve element 17—18 aligned with the valve seats 13 and 14. The valve stem ends at 28, which is a point approximately mid-way between the bearings 23 and 25, but not necessarily so, except that it is wholly within the confines of the milk can cover. The valve stem is manipulated by a separate stem piece 24 which is inserted through an aperture or bearing 25 which also helps to keep it in alignment for contact with the main valve stem at 28. A finger-piece 26 is preferably removably secured on the outer end of the stem piece 24. A protecting housing 27 is soldered or otherwise secured on the parts 9 and 10, to cover the loop 21 and keep liquid from passing to the bearings from the can while inverted to pass the liquid through the inlet 12 and outlet 14.

Preferably, but not essentially, the outer wall or outlet-wall 4 is inclined so the liquid will flow towards the outlet 14 when the can is inverted.

Figure 2:
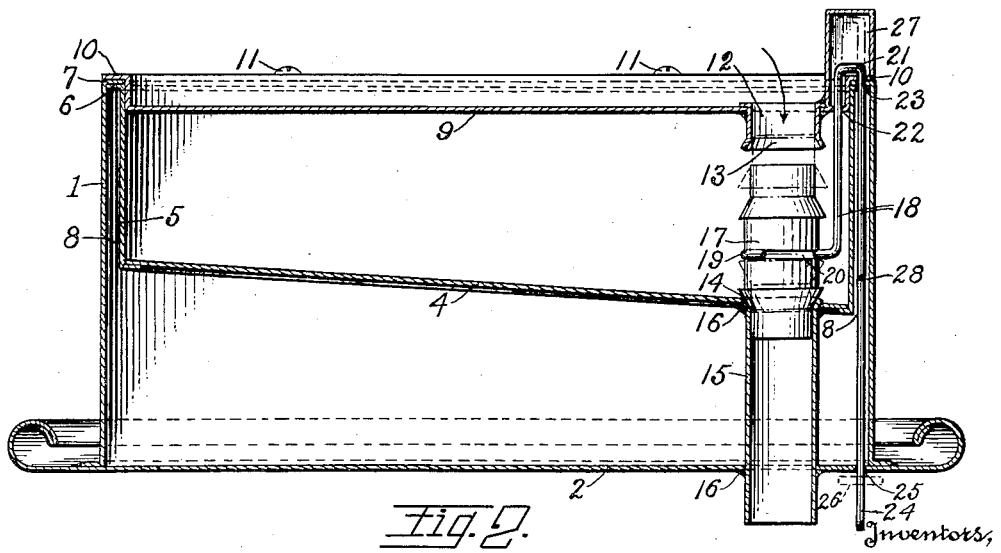
Figure 2 is a view of the parts shown in Figure 1, except the can's mouth being omitted, the measuring vessel (can cover) being inverted, the broken line position of the valve showing how it prevents entrance of milk into the measuring chamber while milk is being dispensed therefrom, the loop of the valve-stem-connection being broken to disclose the groove in which it fits around the valve-body.

In measuring and dispensing liquid, assuming that the measuring receptacle holds a quart, the milk-can being full or partly full and having the measuring cover in place; the whole is now inverted, and at once the valve gravitates to the position shown in full lines in Figure 2, thus first closing the outlet valve-element 14, and then opening the valve-element 13, so the milk now enters the measuring chamber from the can, through the inlet 12 and the air which was in the measuring chamber passes through the inlet 12 rising up into the main body of the milk-can to displace the milk removed, at the same time agitating, stirring and uniformly mixing the milk in the main body of the milk can so that each quart dispensed is of uniform quality as well as quantity. After allowing enough time for filling the measuring chamber, the tube 15 is held over the receiving vessel of the customer, and then the valve is lifted by an upward pressure on the part 24 or 26, so as to open the outlet 14 after closing the inlet 13, the valve mechanism in effect being a one-way valve; then, when the milk or liquid ceases to flow, if a second measure of liquid is desired, the valve is released, so as to permit the measuring chamber again to fill; and the above-described operation is repeated for as many measures of the liquid as may be desired by the customer.

The outlet tube 15 may project outward beyond the disc 2, to any desired extent, and be normally closed by a removable cap 29, or other appropriate means for keeping extraneous matter out of the measuring chamber.

Although we have described this embodiment of our invention quite specifically, we do not intend to limit our patent protection to these specific details of construction, arrangement or design, for the invention is susceptible of numerous changes within the scope of the inventive ideas as implied and claimed.

What we claim as our invention is:

1. The combination of a liquid container, having an opening in its upper end and adapted to be inverted, a cover having a skirt fitted in the open upper end of the container and thereby normally held thereon, a measuring chamber within and secured to said skirt and thereby united with said cover and having an inlet and an outlet through which may flow liquid from the container, and means to automatically open said inlet and close said outlet when the container is inverted for permitting the measuring chamber to be filled from the container, and means to actuate the first said means and thereby to dispense the measured liquid, substantially as shown.

2. The structure defined by claim 1, the said means including a dual valve-body and a valve-stem, the latter extending through bearings which are out of alignment with the inlet and outlet and which hold the valve body in alignment with the inlet and outlet.

3. The structure defined by claim 1, the said means including a valve-body aligned with the inlet and outlet, and a valve stem out of alignment with the inlet and outlet, the end of such valve stem terminating within the mechanism so that it may not be manipulated from the outside except by a separate valve stem piece which is inserted from the outside and which merely serves to lift the valve-body from the outlet position to the inlet, the valve body returning to the outlet position of its own weight after the upward pressure upon it is removed.

4. The structure defined by claim 1, the said cover having a skirt normally fitted snugly in the mouth of the container, said measuring chamber including a continuous wall within and spaced from said skirt, said measuring chamber also including a wall which has said outlet therethrough and also a bearing therethrough and a housing thereon to protect the bearing, said means including a dual valve-body aligned with said inlet and outlet for alternately closing and opening them, said means also including a valve stem having a loop in said housing and extending thence through the space between said skirt and continuous wall and ending therein, and which is manipulated by a separate stem which is inserted from the outside of the cover and is aligned with the looped valve stem by means of a bearing or other similar arrangement, thus providing a convenient and effective manipulative means to cause the valve-body to close and open said inlet and said outlet.

5. The structure defined by claim 1, said cover being removable from the container for permitting the latter to be cleaned, sterilized and filled, said measuring chamber having means to secure one of its walls removably in place so access can be had to its interior for cleaning and sterilizing and for possible repairs, the first said means including a dual valve-body and a valve-stem, the removable wall having a bearing for the valve stem which latter has means to hold it in said bearing so that the valve-body and valve-stem are removable with the said wall and replaceable therewith for assuring proper alignment of the valve body with said inlet and outlet.

6. A measuring chamber having an inlet and an outlet and provided with means to attach it to a liquid container in proper position for permitting liquid to flow from the container through said inlet into said measuring chamber, a dual valve-body aligned with the inlet and outlet and provided with a valve stem out of alignment with the inlet and outlet and including manipulative means to control movement of the valve-body to and from the inlet and outlet.

7. The structure defined by claim 1, the first and second said means including a dual valve-body and a valve stem, the former so constructed as to at no time allow the inlet and outlet to be simultaneously open but which closes off each opening in turn before allowing the other to open.

8. The combination of a liquid container, a cover for the container and normally seated and held thereon, a measuring chamber united with the cover and having an inlet and an outlet through which may flow liquid from the container, and means to alternately open and close said inlet and outlet for permitting the measuring chamber to be filled from the container and to dispense the measured liquid through said outlet, the said means including a dual valve-body and a valve-stem, the latter extending through bearings which are out of alignment with the inlet and outlet and which hold the valve-body in alignment with the inlet and outlet.

HAROLD J. McLAUGHLIN.
JULIAN C. BARREDA.